June 27, 1961  D. MacNEIL TORRANCE  2,989,875
BRAKING MEANS FOR MOTOR VEHICLES
Filed July 20, 1959
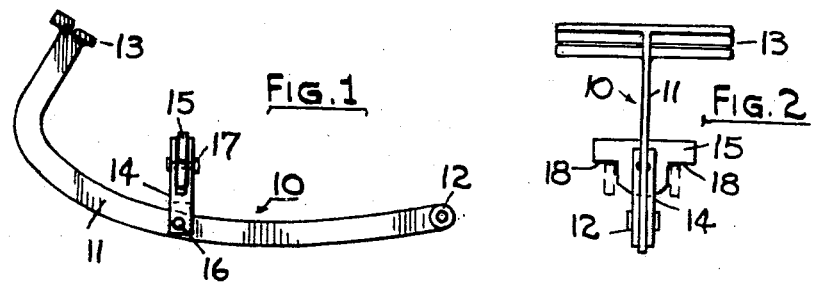
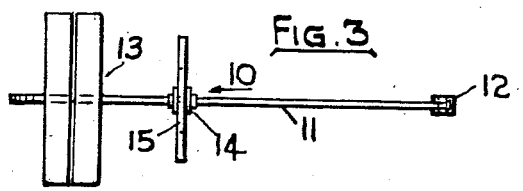
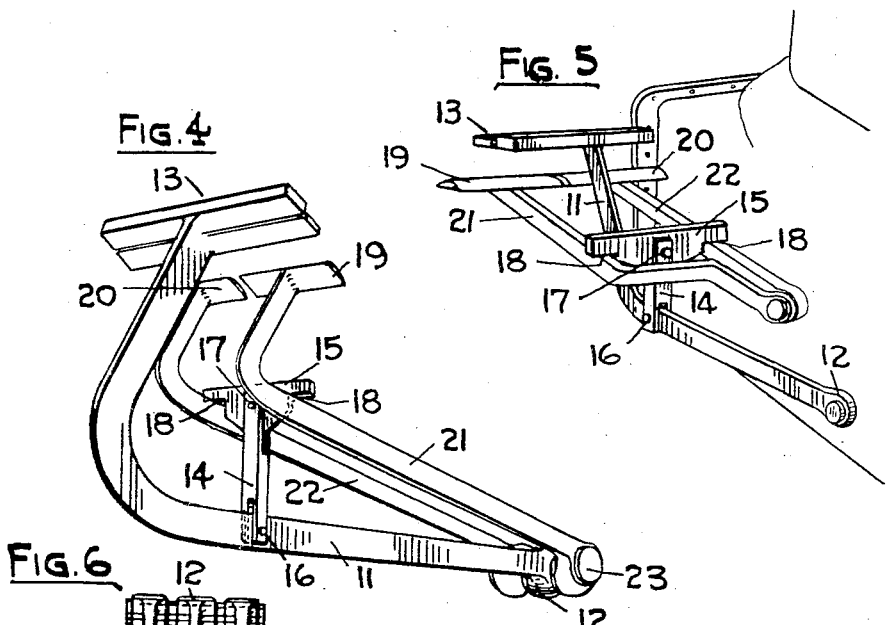
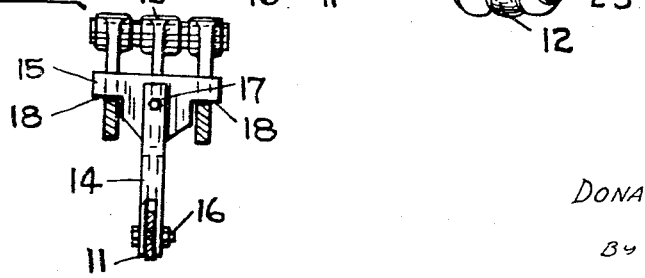
INVENTOR
DONALD MacNEIL TORRANCE
By Irwin S. Thompson
ATTY.

United States Patent Office 2,989,875
Patented June 27, 1961

2,989,875
BRAKING MEANS FOR MOTOR VEHICLES
Donald MacNeil Torrance, Lincoln Road,
Carterton, New Zealand
Filed July 20, 1959, Ser. No. 828,227
Claims priority, application New Zealand July 29, 1958
6 Claims. (Cl. 74—478)

This invention relates to improvements in braking means for motor vehicles of the type in which two brake pedals are arranged side by side, one to control the brake or brakes on one side of that vehicle and the other to control the brakes on the other side. The invention has particular application to tractors where, to assist in their manoeuvering, one rear wheel may be braked while the other one is free, and vice versa. The invention will hereinafter be described in relation, but is not limited, to tractors.

In these tractors the two brake pedals are arranged so that they almost touch. This enables the driver to press one or other of the pedals by swinging his foot slightly to the right or left of the line between the pedals or, alternatively, when both brakes are to be applied simultaneously, he presses his foot centrally to bear on both pedals at the same time. In some cases a latch plate is used to clamp these pedals together. This arrangement is not satisfactory as the driver in emergency may apply the brakes when they are coupled, wanting only to apply the brake to one side of the tractor and not the other. Alternatively, wrongly thinking that the brakes are coupled together, the driver in an emergency may press on one pedal thinking that both brakes will be applied. These actions can result in serious accidents.

An object of the present invention is to provide a master pedal brake which is so positioned that the driver will have no risk of making the error as, when that master pedal is depressed both brakes will be applied, such master pedal, however, not preventing the operator from depressing either the brake for the right side or left side of that tractor.

The invention comprises broadly braking means for a vehicle such as a tractor, of that type having two adjacent brake levers, one for operating the brake or brakes on one side of the vehicle and the other for operating the brake or brakes on the other side of that vehicle, characterised in that a master brake pedal on a pedal lever is so mounted that such pedal lever locates close to the other two brake levers and, upon depression of the master brake pedal, the lever thereof carries with it the other two brake levers to cause the brakes connected thereto to be applied simultaneously, such master brake pedal not interfering with the individual depression of either of the other two brake levers.

In further describing the invention, reference will be made hereinafter to the accompanying drawing, in which:

FIGURE 1 is a side view,
FIGURE 2 is an end view,
FIGURE 3 is a plan view of a master pedal brake,
FIGURE 4 is a perspective view of a master pedal brake mounted to operate upon pedal brakes coming from the back of a tractor.
FIGURE 5 is a perspective view of a master pedal brake mounted to operate upon pedal brakes coming from the front of a tractor, and
FIGURE 6 is a cross section through the three brakes showing a cross bar of the master brake for operating upon the others.

As illustrated the master pedal brake 10 comprises a pedal lever 11 which extends from one end which is adapted as by a bearing 12 for journalling an axle or pin located on a tractor. The other end of the pedal lever 11 is bent upwardly with a master pedal 13 affixed on such end.

On this lever 11 is mounted an arm 14 to the upper end of which is pivoted the cross bar 15. Preferably this arm 14 has its lower end formed with a deep slot to freely take the pedal lever 11 and a pivot pin 16 passes centrally through this lower end and the lever 11. Similarly, this arm 14 has its upper end formed with a deep slot to take the cross bar 15 and a pivot pin 17 passes through the end and centrally through the cross bar 15. The bar can be formed out of relatively heavy steel plate and have its outer sides shaped with shoulders 18 positioned to suit the levers of the ordinary pedal brakes.

In detailing the invention it will now be described as being applied to a tractor having an independent brake action for both of its back wheels. To provide for this at present two side by side pedals 19, 20, are mounted, each on the free end of a pedal lever 21, 22, the other ends of the levers being mounted on a common brake pedal shaft 23. From one pedal lever connections (not shown), as by cables or links, lead to the actual braking mechanism on the rear wheel on one side of the tractor, while connections (not shown) from the other pedal lever lead to the rear wheel on the other side of the tractor. Thus by the depressing of one pedal 20 or 19 the brake on one side only of the tractor may be applied without having any braking effect on the other wheel, and vice versa.

The lever 11, hereinafter referred to as the "master lever," is mounted on the chassis as for instance by the axle pin 23 so that it may swing in a vertical line between the two aforementioned pedal levers 19, 20 with the master pedal 13 located a distance above and forward of the other two brake pedals 19, 20 that is, towards the operator.

In FIGURE 5 the brake pedals are ones extending from under the back of a tractor, whilst those in FIGURE 6 extend from a forward point on a tractor; in both instances, however, the master pedal 13 is located slightly above and forward of the brake pedals 19, 20. The positioning of the master pedal 13 is preferably such that it be readily available to the natural movement of the foot of the driver when he has occasion to apply the tractor brakes quickly as, for instance, in emergency. The master pedal 13 will, however, not get in the way of the foot of the operator if he moves it slightly to the left or right to press on to either one of the other brake pedals.

On the master lever 11 is the cross bar 15 which projects across above the other two pedal levers 19, 20, and is such that, on the master lever 11 being pressed down, the cross bar 15 will also force down together both of the pedal levers, 19, 20, one on each side of the master lever 11. The cross bar 15 is not connected to either of these pedal levers 19, 20, so that both of these latter may be swung down and allowed to return independently of each other and of the master lever 11.

Thus in use, when the driver wants to apply both left and right hand brakes of the tractor at the same time, the depressing of the master pedal 13 effects this desired action, as the action swings the two other pedal levers 19, 20 to cause the brake mechanism to be applied to the wheel on each side of the tractor. On release of the pressure on the master pedal 13 return spring mechanism on the standard brake levers may also carry up the master lever and pedal, or it may also have its own return mechanism.

It is seldom that equal throw of each brake pedal 19 or 20 in a tractor produces equal braking effect on each wheel, and to allow for this the arm 14 pivots on the master lever 11 and to compensate for this difference the cross bar 15 pivoted to the arm 14 has an independent rocking movement of up to about 150°. This movement provides as the cross bar 15 on the depressing of the master pedal 13 bears on to each pedal lever 19, 20, it may swing so that the weaker brake mechanism may have more movement than the stronger, and this compensation will result in an equalization or a more even braking of the tractor.

It will be apparent that the shape and size of the master pedal lever 11 must be varied to suit different makes and types of tractors, and is not limited to construction shown in the drawing. Further, the hinging end of the master lever may be varied to suit a construction of a tractor.

Having now described my invention what I claim is:

1. A braking device for a vehicle having one end of adjacent brake levers mounted on a common shaft, said brake levers having brake pedals mounted on the other end in a common plane, comprising a master brake lever having one end pivotally mounted on said shaft and the other end having a master brake pedal, said master brake lever having a portion extending below and another portion extending above said common plane of said brake pedals and movable vertically therebetween, an arm having one end pivotally mounted on said master brake lever, and a crossbar pivotally mounted to the other end of said arm to engage said brake levers whereby upon depression of said master brake lever said crossbar compensatingly depresses said brake levers to apply equal braking force to each brake lever.

2. A braking device according to claim 1 in which said crossbar has its outer sides shaped with shoulders.

3. A braking device for a vehicle comprising adjacent brake levers having one of their ends pivotally mounted on a support means and the other ends having brake pedals, a vertically movable master brake lever having one end pivotally mounted on said support means and the other end having a master brake pedal, said master brake lever having a configuration wherein part of said master brake lever extends below said brake levers and the other part containing the master brake pedal extends upwardly above said brake pedals, an arm having one end pivotally mounted on said master brake lever, and a crossbar pivotally mounted to the other end of said arm to engage said brake levers whereby, upon depression of said master brake lever, said crossbar compensatingly depresses said brake levers to apply equal braking force to each brake lever.

4. A braking device according to claim 3 in which said crossbar has its underneath outer sides shaped with shoulders positioned to suit the brake levers.

5. A braking device according to claim 3 in which said support means includes a common shaft for pivotally mounting said brake levers, and a pivot pin spaced from said common shaft for pivotally mounting said master brake lever.

6. A braking device according to claim 3 in which said support means consists of a common shaft for pivotally mounting said brake levers and said master brake lever.

References Cited in the file of this patent

UNITED STATES PATENTS

| 1,420,290 | Schofield | June 20, 1922 |
| 2,071,013 | Ajdukovich | Feb. 16, 1937 |

FOREIGN PATENTS

| 835,840 | Germany | Apr. 3, 1952 |
| 1,122,544 | France | May 22, 1956 |